US011888139B2

(12) United States Patent
Aoki et al.

(10) Patent No.: US 11,888,139 B2
(45) Date of Patent: Jan. 30, 2024

(54) TEMPERATURE ADJUSTMENT CIRCUIT

(71) Applicant: HONDA MOTOR CO., LTD., Tokyo (JP)

(72) Inventors: Kengo Aoki, Saitama (JP); Tetsu Miyamoto, Saitama (JP); Ayumu Uno, Tokyo (JP); Takeshi Otani, Saitama (JP); Daisuke Komazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 367 days.

(21) Appl. No.: 17/415,364

(22) PCT Filed: Dec. 21, 2018

(86) PCT No.: PCT/JP2018/047375
§ 371 (c)(1),
(2) Date: Jun. 17, 2021

(87) PCT Pub. No.: WO2020/129259
PCT Pub. Date: Jun. 25, 2020

(65) Prior Publication Data
US 2022/0069385 A1 Mar. 3, 2022

(51) Int. Cl.
*H01M 10/6568* (2014.01)
*H01M 10/613* (2014.01)
(Continued)

(52) U.S. Cl.
CPC ....... *H01M 10/6568* (2015.04); *B60L 53/302* (2019.02); *B60L 58/26* (2019.02);
(Continued)

(58) Field of Classification Search
CPC ............. H01M 10/486; H01M 10/613; H01M 10/6568; B60L 53/302; B60L 58/26
See application file for complete search history.

(56) References Cited

U.S. PATENT DOCUMENTS

2010/0300646 A1* 12/2010 Sawaguchi ............. B60L 58/27
165/51
2016/0318370 A1 11/2016 Rawlinson
(Continued)

FOREIGN PATENT DOCUMENTS

CN 106080225 A 11/2016
CN 106898841 A 6/2017
(Continued)

OTHER PUBLICATIONS

Mar. 26, 2019, International Search Report issued for related PCT application No. PCT/JP2018/047375.
(Continued)

*Primary Examiner* — David V Henze-Gongola
(74) *Attorney, Agent, or Firm* — Paratus Law Group, PLLC

(57) ABSTRACT

A temperature adjustment circuit includes a first temperature adjustment circuit and a second temperature adjustment circuit in which a switching part that is configured to switch between a circulation state where a heat-transfer medium is circulated through a connection circuit in which the first temperature adjustment circuit and the second temperature adjustment circuit are connected to each other and a non-circulation state where the heat-transfer medium is not circulated through the connection circuit.

15 Claims, 6 Drawing Sheets

(51) Int. Cl.
*H01M 10/625* (2014.01)
*H01M 10/48* (2006.01)
*H02J 7/00* (2006.01)
*B60L 53/302* (2019.01)
*B60L 58/26* (2019.01)

(52) U.S. Cl.
CPC ....... *H01M 10/486* (2013.01); *H01M 10/613* (2015.04); *H01M 10/625* (2015.04); *H02J 7/00309* (2020.01)

(56) References Cited

U.S. PATENT DOCUMENTS

| | | | |
|---|---|---|---|
| 2016/0318409 A1 | 11/2016 | Rawlinson | |
| 2016/0318410 A1 | 11/2016 | Rawlinson | |
| 2017/0008407 A1* | 1/2017 | Porras | B60H 1/00921 |

FOREIGN PATENT DOCUMENTS

| | | |
|---|---|---|
| CN | 108556660 A | 9/2018 |
| JP | H11-022466 A | 1/1999 |
| JP | 2004-076603 A | 3/2004 |
| JP | 2006-296193 A | 10/2006 |
| JP | 2008-290636 A | 12/2008 |
| JP | 2012-193673 A | 10/2012 |
| JP | 2013-188098 A | 9/2013 |
| JP | 5336033 B2 | 11/2013 |
| WO | WO 2009/110352 A1 | 9/2009 |

OTHER PUBLICATIONS

Mar. 26, 2019, International Search Opinion issued for related PCT application No. PCT/JP2018/047375.
Jan. 5, 2021, International Preliminary Report on Patentability issued for related PCT application No. PCT/JP2018/047375.
Sep. 16, 2023, Translation of Chinese Office Action issued for related CN Application No. 201880100256.6.

* cited by examiner

TEMPERATURE ADJUSTMENT CIRCUIT

CROSS REFERENCE TO PRIOR APPLICATION

This application is a National Stage Patent Application of PCT International Patent Application No. PCT/JP2018/047375 (filed on Dec. 21, 2018) under 35 U.S.C. § 371, which is hereby incorporated by reference in its entirety.

TECHNICAL FIELD

The present invention relates to a temperature adjustment circuit that performs temperature adjustment for a battery or the like.

BACKGROUND ART

There has been known a temperature adjustment circuit for an electric vehicle that includes: a first temperature adjustment circuit; a second temperature adjustment circuit; a pump that causes a heat-transfer medium to circulate in at least one of the first temperature adjustment circuit and the second temperature adjustment circuit; a connection path that connects the first temperature adjustment circuit and the second temperature adjustment circuit to form a connection circuit; and a switching unit that is capable of toggling between a circulation state where the heat-transfer medium is circulated through the connection circuit and a non-circulation state where the heat-transfer medium is not circulated through the connection circuit.

For example, Patent Literature 1 discloses a temperature adjustment circuit that includes: a cooling circuit that cools a battery; a cooling circuit that cools an inverter; a first refrigerant pump that is provided in the cooling circuit for cooling the battery; a second refrigerant pump that is provided in the cooling circuit for cooling the inverter; and a switching valve that switches between a state where a temperature of the battery and a temperature of the inverter are adjusted in a single circuit (hereinafter, also referred to as a circulation state) and a state where the temperature of the battery and the temperature of the inverter are adjusted in separate circuits (hereinafter, also referred to as a non-circulation state). Patent Literature 1 discloses that, in the temperature adjustment circuit, when an outside air temperature is lower than a predetermined temperature, the circulation state is established, and when the outside air temperature is equal to or higher than the predetermined temperature, the non-circulation state is established, thereby improving accuracy of temperature adjustment.

Patent Literature 2 discloses a device that includes two heat exchangers connected in parallel and that cools a battery with one of the heat exchangers.

CITATION LIST

Patent Literature

Patent Literature 1: JP2013-188098A
Patent Literature 2: Japanese Patent No. 5336033

SUMMARY OF INVENTION

Technical Problem

However, in the temperature adjustment circuit disclosed in Patent literature 1, since the heat-transfer medium passes through a first cooler and a second cooler in the circulation state, so that there is a problem that pressure drop increases. In addition, a temperature adjustment circuit disclosed in Patent Literature 2 is a device that cools a battery but does not cool two cooling targets by using one connection circuit.

The present invention provides a temperature adjustment circuit that cools two cooling targets with one connection circuit and that can reduce pressure drop when a heat-transfer medium is circulated in a circulation state.

Solution to Problem

The present invention includes:
a first temperature adjustment circuit that includes:
  a first pump that is configured to supply a heat-transfer medium to a first cooling target and
  a first heat exchanging part that transfers heat between the heat-transfer medium and an air-conditioning refrigerant;
a second temperature adjustment circuit that includes:
  a second pump that is configured to supply the heat-transfer medium to a second cooling target and
  a second heat exchanging part that transfers heat between the heat-transfer medium and outside air;
a first connection path that connects a first connection portion of the first temperature adjustment circuit and a first connection portion of the second temperature adjustment circuit;
a second connection path that connects a second connection portion of the first temperature adjustment circuit and a second connection portion of the second temperature adjustment circuit; and
a switching part that is configured to switch between
  a circulation state where the heat-transfer medium is circulated through a connection circuit in which the first temperature adjustment circuit and the second temperature adjustment circuit are connected to each other and
  a non-circulation state where the heat-transfer medium is not circulated through the connection circuit,
in which the first heat exchanging part is disposed between the second connection portion of the first temperature adjustment circuit and the first connection portion of the first temperature adjustment circuit in a flow direction of the heat-transfer medium in the first temperature adjustment circuit in the non-circulation state, and
in which the switching part includes:
  a first shut-off valve that is provided between the second connection portion of the first temperature adjustment circuit and the first heat exchanging part in a flow direction of the heat-transfer medium in the first temperature adjustment circuit in the non-circulation state and
  a second shut-off valve that is provided between the first connection portion of the second temperature adjustment circuit and the first connection portion of the first temperature adjustment circuit in a flow direction of the heat-transfer medium in the connection circuit in the circulation state.

Further, the present invention includes:
a first temperature adjustment circuit that includes:
  a first pump that is configured to supply a heat-transfer medium to a first cooling target and
  a first heat exchanging part that transfers heat between the heat-transfer medium and an air-conditioning refrigerant;
a second temperature adjustment circuit that includes:

a second pump that is configured to supply the heat-transfer medium to a second cooling target and a second heat exchanging part that transfers heat between the heat-transfer medium and outside air;

a first connection path that connects a first connection portion of the first temperature adjustment circuit and a first connection portion of the second temperature adjustment circuit;

a second connection path that connects a second connection portion of the first temperature adjustment circuit and a second connection portion of the second temperature adjustment circuit; and a switching part that is configured to switch between a circulation state where the heat-transfer medium is circulated through a connection circuit in which the first temperature adjustment circuit and the second temperature adjustment circuit are connected to each other and a non-circulation state where the heat-transfer medium is not circulated through the connection circuit, in which the first heat exchanging part is disposed between the second connection portion of the first temperature adjustment circuit and the first connection portion of the first temperature adjustment circuit in a flow direction of the heat-transfer medium in the first temperature adjustment circuit in the non-circulation state, in which the first cooling target is a battery, in which the second cooling target is a power conversion device, and in which, in the circulation state, the heat-transfer medium flows through the second cooling target, the second heat exchanging part, and the first cooling target in this order.

Advantageous Effects of Invention

According to the present invention, since the first temperature adjustment circuit and the second temperature adjustment circuit constitute the connection circuit via the first connection path and the second connection path, the two cooling targets can be cooled with one connection circuit. Further, when the heat-transfer medium is circulated in the circulation state, the pressure drop can be reduced since the heat-transfer medium is circulated without passing through the first heat exchanging part.

DESCRIPTION OF EMBODIMENTS

Hereinafter, an embodiment of the present invention will be described with reference to FIGS. 1 to 3.

[Temperature Adjustment Circuit]

Figure 1:
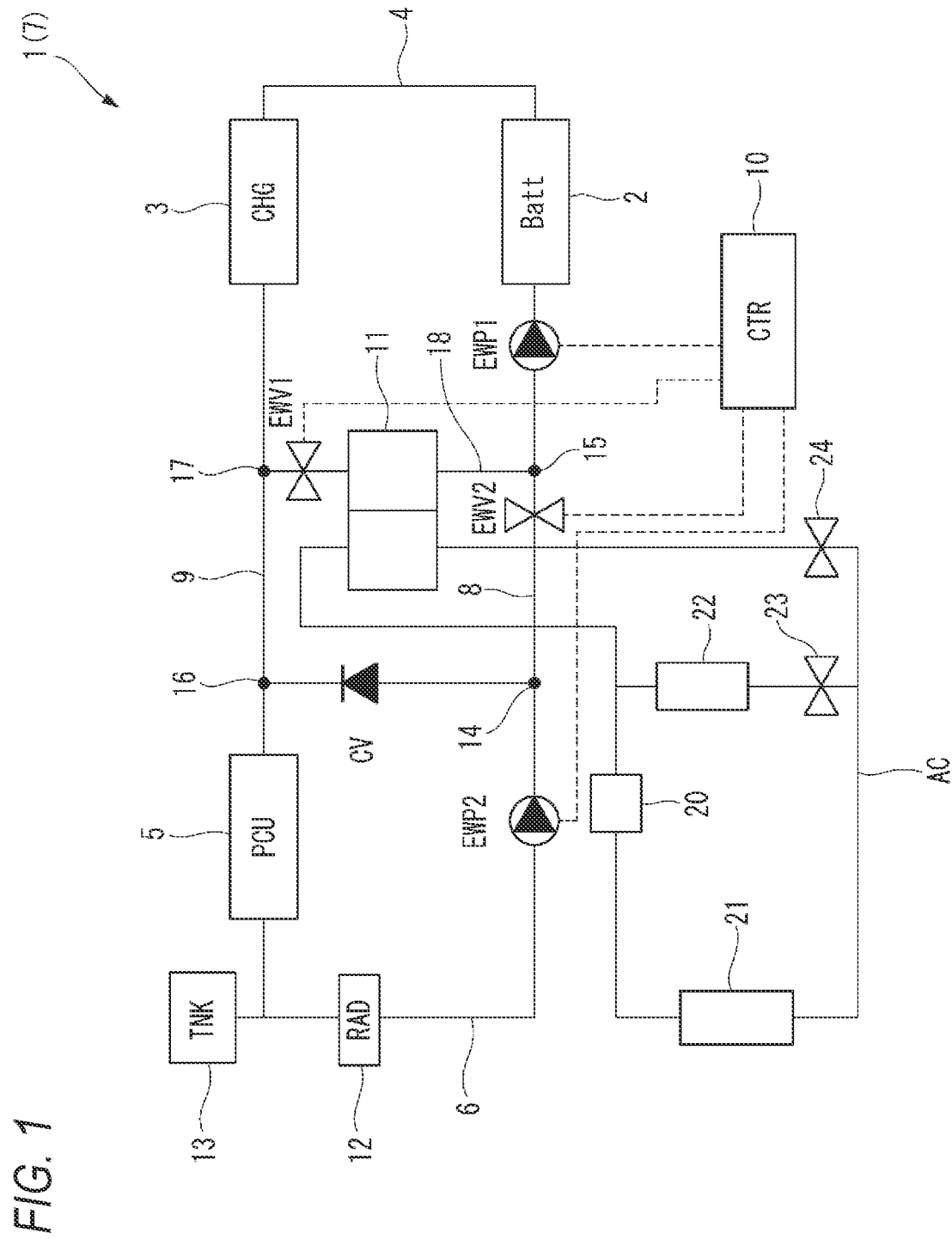
FIG. 1 is a circuit diagram illustrating a configuration of a temperature adjustment circuit according to an embodiment of the present invention.

As illustrated in FIG. 1, a temperature adjustment circuit 1 for an electric vehicle includes: a first temperature adjustment circuit 4 that transfers heat with a batter 2 and a charger 3; a second temperature adjustment circuit 6 that transfers heat with a power conversion device 5 that is configured to supply power to a motor 105 (see FIG. 6); connection paths 8 and 9 that are configured to connect the first temperature adjustment circuit 4 and the second temperature adjustment circuit 6 to form a connection circuit 7; a first electrically-actuated shut-off valve EWV1 and a second electrically-actuated shut-off valve EWV2 that are capable of switching between a series mode (circulation state) where a heart-transfer medium is circulated through the connection circuit 7 and a separate mode (non-circulation state) where the heat-transfer medium is not circulated through the connection circuit 7 but is circulated through separate temperature adjustment circuits 4 and 6; and a control device 10 that is configured to control the electrically-actuated shut-off valve EWV1, the electrically-actuated shut-off valve EWV2, and the like. The heat-transfer medium is a liquid medium such as water, radiator fluid, or coolant.

[First Temperature Adjustment Circuit]

The first temperature adjustment circuit 4 includes: a first pump EWP1 that is configured to cause the heat-transfer medium to circulate in the circuit; the battery 2 and the charger 3 that are disposed downstream of the first pump EWP1; the first electrically-actuated shut-off valve EWV1 that is disposed downstream of the charger 3; and a chiller 11 that is disposed downstream of the first electrically-actuated shut-off valve EWV1 and upstream of the first pump EWP1 and cools the heat-transfer medium by heat transfer with an air-conditioning refrigerant circulating in an air conditioning circuit AC of the electric vehicle.

The air conditioning circuit AC includes a compressor 20, a condenser 21, an evaporator 22, and shut-off valves 23 and 24 with the compressor 20, the condenser 21, and the evaporator 22 connected in series and the evaporator 22 and the chiller 11 connected in parallel. In the air conditioning circuit AC, a flow path to the evaporator 22 and a flow path to the chiller 11 are configured to be switched by the shut-off valves 23 and 24.

Figure 2:
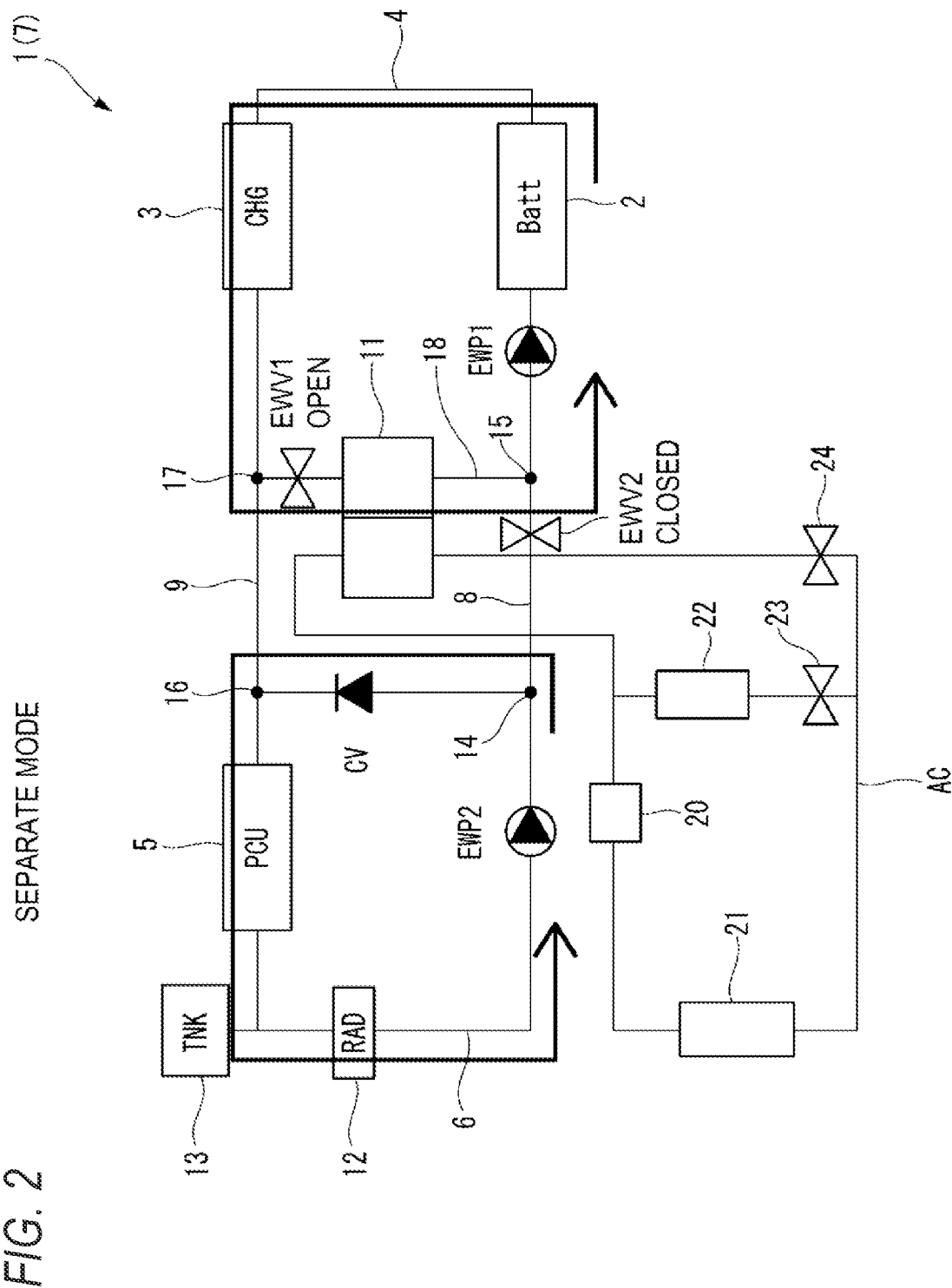
FIG. 2 is an illustrative diagram illustrating a flow of a heat-transfer medium in a separate mode in the temperature adjustment circuit of FIG. 1.

As illustrated in FIG. 2, in the separate mode, by driving the first pump EWP1 in a valve-open state of the first electrically-actuated shut-off valve EWV1, the heat-transfer medium discharged from the first pump EWP1 can be circulated through the battery 2, the charger 3, and the chiller 11 in this order. By setting the shut-off valve 24 of the air conditioning circuit AC to a valve-open state in the separate mode, the heat-transfer medium cooled by the chiller 11 transfers heat with the battery 2 and the charger 3, so that the battery 2 and the charger 3 are appropriately cooled. By causing the heat-transfer medium discharged from the first pump EWP1 to circulate through the battery 2, the charger 3, and the chiller 11 in this order, the battery 2 and the charger 3 can be cooled simultaneously, so that the battery 2 and the charger 3 that generate heat during charging can be cooled efficiently. In addition, the battery 2 and the charger 3 can be disposed close to each other, so that a cooling pipe can be shortened.

[Second Temperature Adjustment Circuit]

The second temperature adjustment circuit 6 includes: the second pump EWP2 that is configured to cause the heat-transfer medium to circulate in the circuit; a check valve CV that is disposed downstream of the second pump EWP2; the power conversion device 5 that is disposed downstream of the check valve CV; a buffer tank 13 that is disposed downstream of the power conversion device 5; and a radiator 12 that is disposed downstream of the buffer tank 13 and cools the heat-transfer medium by heat transfer with outside air. The power conversion device 5 includes at least one of an inverter that converts DC power into AC power and converts AC power into DC power, and a DC-to-DC converter that steps up or down a DC voltage.

As illustrated in FIG. 2, in the separate mode, by driving the second pump EWP2, the heat-transfer medium discharged from the second pump EWP2 can be circulated through the power conversion device 5, the buffer tank 13, and the radiator 12 in this order. Accordingly, the heat-transfer medium cooled by the radiator 12 transfers heat with the power conversion device 5, so that the power conversion device 5 is appropriately cooled. In addition, since the second pump EWP2 is disposed downstream of the radiator 12, it is possible to efficiently suppress heat generation caused by operation of the second pump EWP2. Moreover, since the second pump EWP2 can be used in a limited temperature range, a highly versatile pump can be used. Furthermore, by providing the buffer tank 13 downstream of the power conversion device 5 that generates a large amount of heat, it is possible to improve air bleeding efficiency.

[Connection Circuit]

The connection paths 8 and 9 include a first connection path 8 and a second connection path 9. The first connection path 8 connects a first connection portion 14 of the second temperature adjustment circuit 6 and a first connection portion 15 of the first temperature adjustment circuit 4. The second connection path 9 connects a second connection portion 16 of the second temperature adjustment circuit 6 and a second connection portion 17 of the first temperature adjustment circuit 4. The first connection portion 14 and the second connection portion 16 of the second temperature adjustment circuit 6 are located downstream of the second pump EWP2 and upstream of the power conversion device 5 in the second temperature adjustment circuit 6. The check valve CV is provided between the first connection portion 14 and the second connection portion 16 of the second temperature adjustment circuit 6. The first connection portion 15 of the first temperature adjustment circuit 4 is located downstream of the chiller 11 and upstream of the first pump EWP1 in the first temperature adjustment circuit 4. The second connection portion 17 of the first temperature adjustment circuit 4 is located downstream of the charger 3 and upstream of the first electrically-actuated shut-off valve EWV1 in the first temperature adjustment circuit 4.

A path between the first connection portion 15 and the second connection portion 17 in the first temperature adjustment circuit 4, that is, a path in the first temperature adjustment circuit 4 where the first electrically-actuated shut-off valve EWV1 and the chiller 11 are disposed functions as a branch path 18 that bypasses a part of the connection circuit 7. The second electrically-actuated shut-off valve EWV2 is provided between the first connection portion 14 of the second temperature adjustment circuit 6 and the first connection portion 15 of the first temperature adjustment circuit 4, that is, in the first connection path 8.

Figure 3:
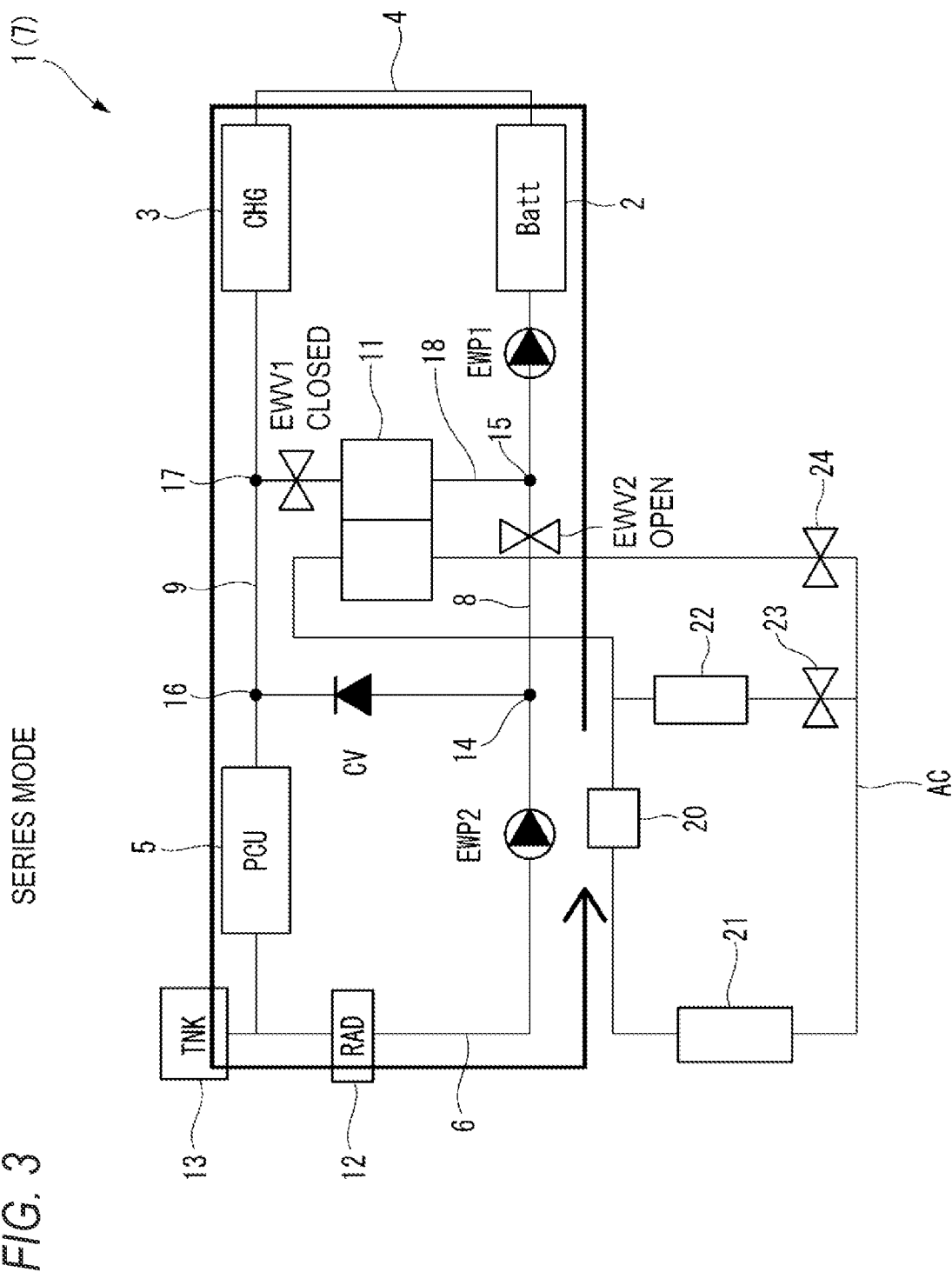
FIG. 3 is an illustrative diagram illustrating a flow of the heat-transfer medium in a series mode in the temperature adjustment circuit of FIG. 1.

As illustrated in FIG. 3, in the series mode, where the heat-transfer medium is circulated through the connection circuit 7, the heat-transfer medium is circulated by driving at least one of the first pump EWP1 and the second pump EWP2. In the series mode, the first electrically-actuated shut-off valve EWV1 is set to a valve-closed state to stop circulation of the heat-transfer medium passing through the branch path 18, and the second electrically-actuated shut-off valve EWV2 is set to a valve-open state. Accordingly, the heat-transfer medium discharged from the first pump EWP1 or the second pump EWP2 circulates through the battery 2, the charger 3, the power conversion device 5, the buffer tank 13, and the radiator 12 in this order, so that the battery 2, the charger 3, and the power conversion device 5 are cooled. At this time, since the heat-transfer medium passing through the radiator 12 can flow to the battery 2 before flowing to the power conversion device 5, the battery 2 having a low management temperature can be preferentially cooled. Further, in the series mode, since the heat-transfer medium is circulated without passing through the chiller 11, pressure drop can be reduced. Further, in the series mode, since the first temperature adjustment circuit 4 and the second temperature adjustment circuit 6 are connected to each other via the connection paths 8 and 9, a pressure change or a flow rate change accompanying thermal expansion of the heat-transfer medium and the like in the two temperature adjustment circuits 4 and 6 can be absorbed by one buffer tank 13.

On the other hand, as illustrated in FIG. 2, in the separate mode, where the heat-transfer medium is not circulated through the connection circuit 7 but is separately circulated through the first temperature adjustment circuit 4 and the second temperature adjustment circuit 6, the first electrically-actuated shut-off valve EWV1 is set to a valve-open state and the second electrically-actuated shut-off valve EWV2 is set to a valve-closed state, and the first pump EWP1 and the second pump EWP2 are driven. Accordingly, although the heat-transfer medium is circulated in each of the temperature adjustment circuits 4 and 6 separately to cool cooling targets in the temperature adjustment circuits 4 and 6, since the first temperature adjustment circuit 4 and the second temperature adjustment circuit 6 are connected via the second connection path 9 even in the separate mode, even if the heat-transfer medium in the first temperature adjustment circuit 4 thermally expands, a pressure change or flow rate change accompanying the thermal expansion can be absorbed by the buffer tank 13 in the second temperature adjustment circuit 6 that is connected via the second connection path 9.

In such a temperature adjustment circuit 1, since the first electrically-actuated shut-off valve EWV1 is provided between the second connection portion 17 of the first temperature adjustment circuit 4 and the chiller 11, even if the first electrically-actuated shut-off valve EWV1 gets out of order (stuck), the heat-transfer medium flows through the second connection path 9 in the series mode, so that the battery 2, the charger 3, and the power conversion device 5 can be cooled. In addition, since the second electrically-actuated shut-off valve EWV2 is provided between the first connection portion 14 of the second temperature adjustment circuit 6 and the first connection portion 15 of the first temperature adjustment circuit 4, even if the second electrically-actuated shut-off valve EWV2 gets out of order (stuck), the battery 2 and the charger 3 can be cooled by the first temperature adjustment circuit 4 in the separate mode, and the power conversion device 5 can be cooled by the second temperature adjustment circuit 6.

[Control Device]

The control device 10 is configured to receive temperature information of the battery 2, the power conversion device 5, and the like and rotation speed information of the first pump EWP1 and the second pump EWP2 to control the first pump EWP1, the second pump EWP2, the first electrically-actuated shut-off valve EWV1, and the second electrically-actuated shut-off valve EWV2 based on determination according to the input information, thereby appropriately operating the temperature adjustment circuit 1.

Then, in the series mode, the control device 10 sets the first electrically-actuated shut-off valve EWV1 to a valve-closed state and sets the second electrically-actuated shut-off valve EWV2 to a valve-open state, and in the separate mode, the control device 10 sets the first electrically-actuated shut-off valve EWV1 to a valve-open state and sets the second electrically-actuated shut-off valve EWV2 to a valve-closed state.

Figure 6:
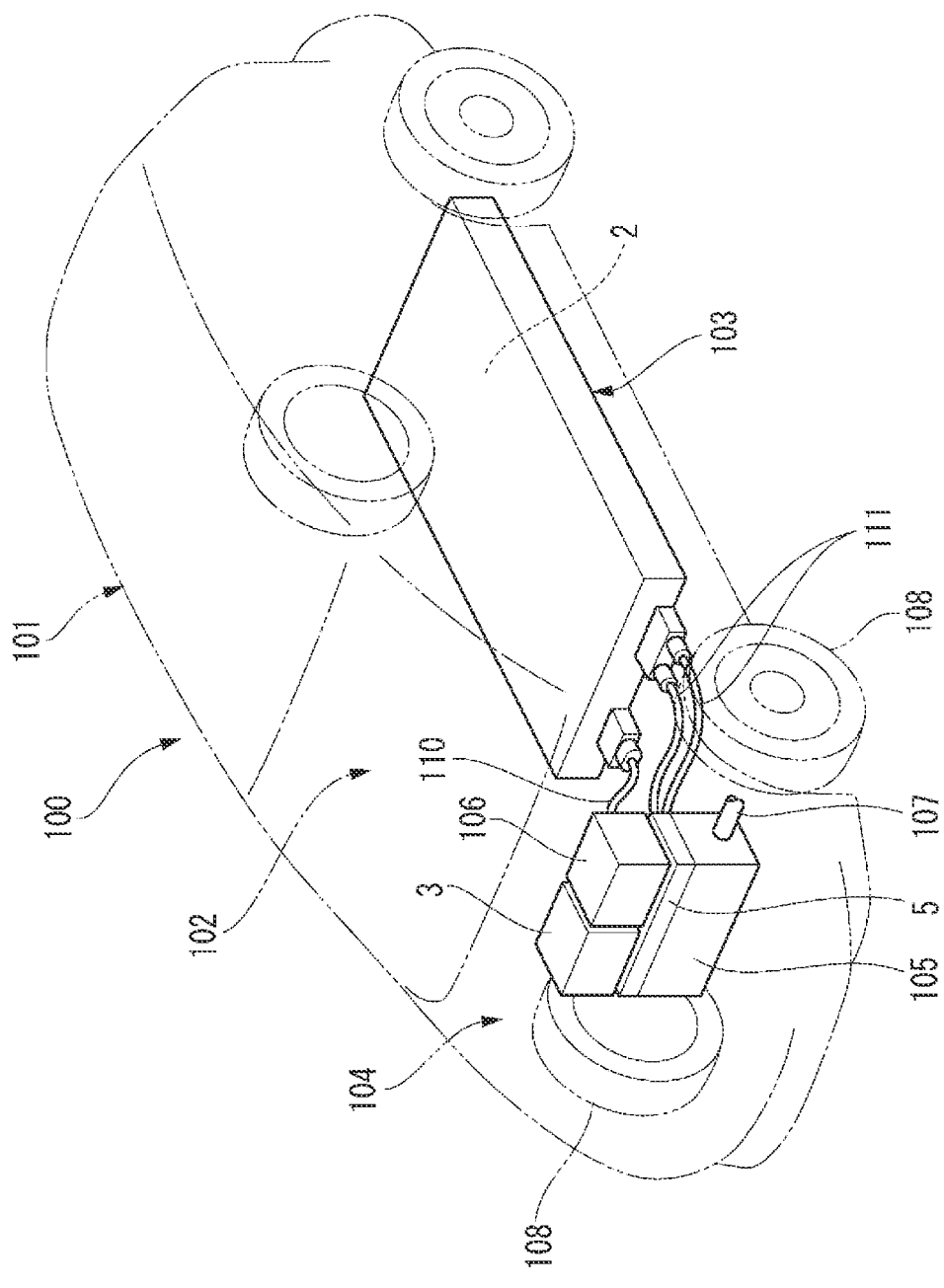
FIG. 6 is a perspective view illustrating a schematic configuration of an electric vehicle in which the temperature adjustment circuit of the present embodiment can be used.

FIG. 6 is a perspective view illustrating a schematic configuration of an electric vehicle 100 in which the temperature adjustment circuit 1 of the present embodiment can be used. Although the electric vehicle 100 may be an electric vehicle or a fuel cell vehicle having only an electric motor as a driving source or a hybrid vehicle having an electric motor and an internal combustion engine, an electric vehicle is taken as an example in the following.

A battery case 103 that houses the battery 2 in a portion under a floor of a vehicle interior 102 is mounted on a vehicle body 101 of the electric vehicle 100. A motor room 104 is provided in a front portion of the electric vehicle 100. The motor 105, the power conversion device 5, a branch unit 106, the charger 3, and the like are provided in the motor room 104.

Rotational driving force of the motor 105 is configured to be transmitted to a shaft 107. Front wheels 108 of the electric vehicle 100 are connected to both ends of the shaft 107. The power conversion device 5 is disposed on an upper side of the motor 105 and is directly fastened and fixed to a case of the motor 105. The power conversion device 5 is electrically connected to a connector of the battery case 103 by a power cable 111. In addition, the power conversion device 5 is electrically connected to the motor 105 by, for example, a three-phase bus bar. The power conversion device 5 drives and controls the motor 105 with power supplied from the battery 2.

The branch unit 106 and the charger 3 are arranged side by side in a left-right direction. The branch unit 106 and the charger 3 are disposed above the power conversion device 5. The branch unit 106 and the charger 3 are disposed in a state of being separated from the power conversion device 5. The branch unit 106 and the battery case 103 are electrically connected by a cable 110 having connectors at both ends.

The branch unit 106 is electrically connected to the charger 3. The charger 3 is configured to be connected to a general external power supply such as a power outlet to charge the battery 2. The charger 3 and the branch unit 106 are electrically connected by a cable (not illustrated) having connectors at both ends.

Although an embodiment of the present invention has been described above, the present invention is not limited to the above-described embodiment, and modifications, improvements, and the like can be made as appropriate. For example, although the charger 3 is cooled by the first temperature adjustment circuit 4 in the above-described embodiment, the charger 3 may be cooled by the second temperature adjustment circuit 6. In this way, the battery 2 and the charger 3 can be cooled separately, and thus it is possible to only cool the battery 2 preferentially.

In addition, although the buffer tank 13 is disposed downstream of the power conversion device 5 and upstream of the radiator 12 in the embodiment described above, the buffer tank 13 may be disposed downstream of the radiator 12 and upstream of the second pump EWP2. Since the buffer tank 13 is provided downstream of the radiator 12 in which a temperature of the heat-transfer medium is low, requirement for heat resistance of the buffer tank 13 can be lowered. In addition, when the heat-transfer medium is injected from the buffer tank 13, injecting time of the heat-transfer medium can be shortened since the second pump EWP2 is located downstream of the buffer tank 13.

Figure 4:
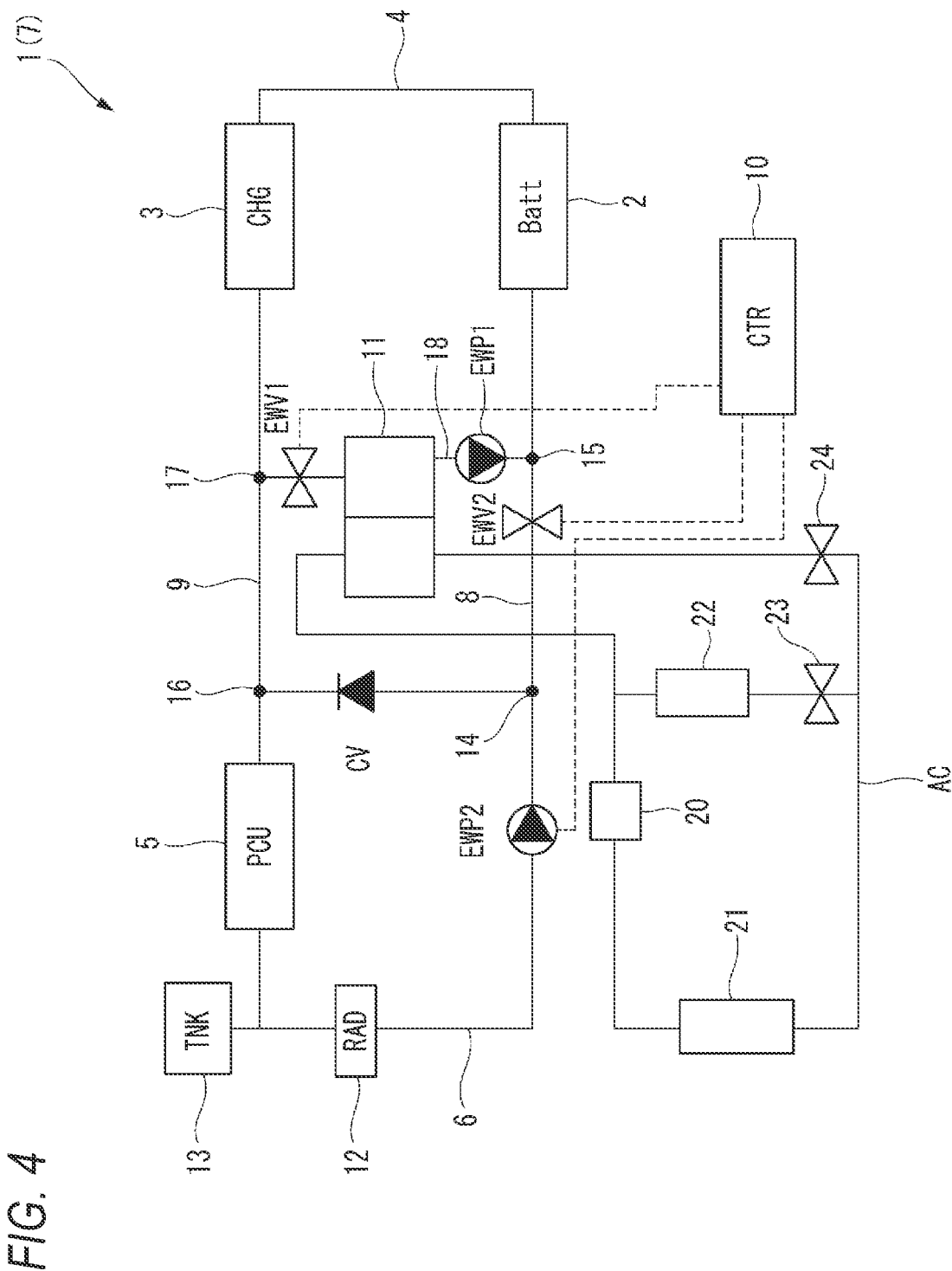
FIG. 4 is a circuit diagram illustrating a configuration of a temperature adjustment circuit according to a first modification of the present embodiment.

In the first temperature adjustment circuit 4 of the embodiment described above, the first pump EWP1 is disposed between the first connection portion 15 of the first temperature adjustment circuit 4 and the battery 2 in a flow direction of the heat-transfer medium in the separate mode. Alternatively, as illustrated in FIG. 4, the first pump EWP1 may be disposed between the second portion 17 of the first temperature adjustment circuit 4 and the first connection portion 15 of the first temperature adjustment circuit 4, that is, in the branch path 18. In this case, when the heat-transfer medium is circulated only by the second pump EWP2 in the series mode, pressure drop can be reduced since the heat-transfer medium is circulated without passing through the first pump EWP1 and the chiller 11.

Figure 5:
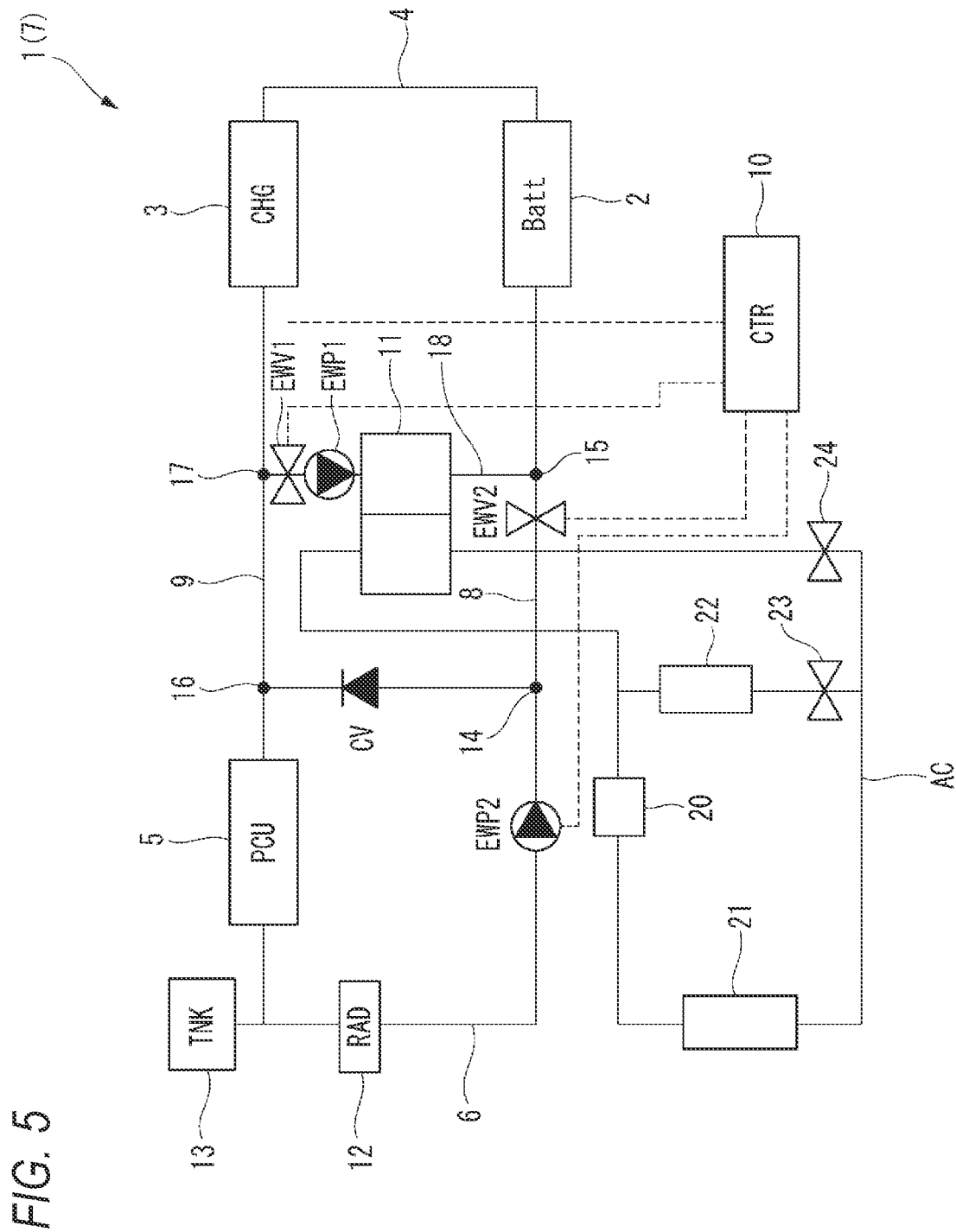
FIG. 5 is a circuit diagram illustrating a configuration of a temperature adjustment circuit according to a second modification of the present embodiment.

In addition, for example, as illustrated in FIG. 5, the first pump EWP1, the chiller 11, the battery 2, and the charger 3 may be arranged in this order in a flow direction of the heal-transfer medium in the separate mode. In this case, in the series mode, the heat-transfer medium can be supplied from the chiller 11 to the battery 2 and the charger 3 without being affected by heat of the first pump EWP1.

In the present specification, at least the following matters are described. Although corresponding components or the like in the above embodiment are shown in parentheses, the present disclosure is not limited thereto.

(1) A temperature adjustment circuit (temperature adjustment circuit 1) includes:
  a first temperature adjustment circuit (first temperature adjustment circuit 4) that includes:
    a first pump (first pump EWP1) that is configured to supply a heat-transfer medium to a first cooling target (battery 2) and
    a first heat exchanging part (chiller 11) that transfers heat between the heat-transfer medium and an air-conditioning refrigerant;
  a second temperature adjustment circuit (second temperature adjustment circuit 6) that includes:
    a second pump (second pump EWP2) that is configured to supply the heat-transfer medium to a second cooling target (power conversion device 5) and
    a second heat exchanging part (radiator 12) that transfers heat between the heat-transfer medium and outside air;
  a first connection path (first connection path 8) that connects a first connection portion (first connection portion 15) of the first temperature adjustment circuit and a first connection portion (first connection portion 14) of the second temperature adjustment circuit;
  a second connection path (second connection path 9) that connects a second connection portion (second connection portion 17) of the first temperature adjustment circuit and a second connection portion (second connection portion 16) of the second temperature adjustment circuit; and
  a switching part (first electrically-actuated shut-off valve EWV1 and second electrically-actuated shut-off valve EWV2) that is configured to switch between
    a circulation state where the heat-transfer medium is circulated through a connection circuit (connection circuit 7) in which the first temperature adjustment circuit and the second temperature adjustment circuit are connected to each other and a non-circulation state where the heat-transfer medium is not circulated through the connection circuit, in which the first heat exchanging part is disposed between the second connection portion of the first temperature adjustment circuit and the first connection portion of the first temperature adjustment circuit in a flow direction of the heat-transfer medium in the first temperature adjustment circuit in the non-circulation state.

According to (1), since the first temperature adjustment circuit and the second temperature adjustment circuit constitute the connection circuit via the first connection path and the second connection path, the two cooling targets can be cooled with one connection circuit. Further, when the heat-transfer medium is circulated in the circulation state, pressure drop can be reduced since the heat-transfer medium is circulated without passing through the first heat exchanging part.

(2) The temperature adjustment circuit according to (1), in which the switching part includes a first shut-off valve (first electrically-actuated shut-off valve EWV1) that is provided between the second connection portion of the first temperature adjustment circuit and the first heat exchanging part in a flow direction of the heat-transfer medium in the first temperature adjustment circuit in the non-circulation state and a second shut-off valve (second electrically-actuated shut-off valve EWV2) that is provided between the first connection portion of the second temperature adjustment circuit and the first connection portion of the first temperature adjustment circuit in a flow direction of the heat-transfer medium in the connection circuit in the circulation state.

According to (2), since the first shut-off valve is provided between the second connection portion of the first temperature adjustment circuit and the first heat exchanging part, even if the first shut-off valve gets out of order (stuck), the heat-transfer medium flows through the second connection path in the circulation state. Accordingly, the first cooling target and the second cooling target can be cooled. In addition, since the second shut-off valve is provided between the first connection portion of the second temperature adjustment circuit and the first connection portion of the first temperature adjustment circuit, even if the second shut-off valve gets out of order (stuck), the first cooling target can be cooled by the first temperature adjustment circuit in the non-circulation state, and the second cooling target can be cooled by the second temperature adjustment circuit.

(3) The temperature adjustment circuit according to (2), further including:

a control device (control device 10) that is configured to control the first shut-off valve and the second shut-off valve, in which the control device sets the first shut-off valve to a valve-closed state and the second shut-off valve to a valve-open state, thereby establishing the circulation state and sets the first shut-off valve to a valve-open state and the second shut-off valve to a valve-closed state, thereby establishing the non-circulation state.

According to (3), the circulation state and the non-circulation state can be switched by switching between the valve-open state and valve-closed state of the first shut-off valve and the second shut-off valve.

(4) The temperature adjustment circuit according to any one of (1) to (3), in which the first cooling target is a battery (battery 2), in which the second cooling target is a power conversion device (power conversion device 5), and in which, in the circulation state, the heat-transfer medium flows through the second cooling target, the second heat exchanging part, and the first cooling target in this order.

According to (4), since the heat-transfer medium passing through the second heat exchanging part in the circulation state can be caused to flow to the battery before flowing to the power conversion device, it is possible to preferentially cool the battery having a low management temperature.

(5) The temperature adjustment circuit according to (4), in which the first temperature adjustment circuit further includes a charger (charger 3).

According, to (5), since the battery and the charger can be cooled simultaneously, it is possible to efficiently cool the battery and the charger that generate heat during charging. In addition, the battery and the charger can be disposed close to each other, so that a cooling pipe can be shortened.

(6) The temperature adjustment circuit according to (4), in which the second temperature adjustment circuit further includes a charger (charger 3).

According to (6), it is possible to cool the battery and the charger separately, so that it is possible to cool only the battery preferentially.

(7) The temperature adjustment circuit according to any one of (4) to (6), in which the second temperature adjustment circuit further includes a buffer tank (buffer tank 13) that is disposed downstream of the second cooling target and upstream of the second heat exchanging part in a flow direction of the heat-transfer medium in the second temperature adjustment circuit in the non-circulation state.

According to (7), air bleeding efficiency can be improved by providing the buffer tank downstream of the power conversion device that generates a large amount of heat.

(8) The temperature adjustment circuit according to any one of (4) to (6), in which the second temperature adjustment circuit further includes a buffer tank that is disposed downstream of the second heal exchanging part and upstream of the second pump in a flow direction of the heat-transfer medium in the second temperature adjustment circuit in the non-circulation state.

According to (8), requirement for heart resistance of the buffer tank can be lowered since the buffer tank is provided downstream of the second heat exchanging part in which a temperature of the heat-transfer medium is low. In addition, when the heat-transfer medium is injected from the buffer tank, injecting time of the heat-transfer medium can be shortened since the second pump is located downstream of the buffer tank.

(9) The temperature adjustment circuit according to any one of (1) to (8), in which, in the second temperature adjustment circuit, the second pump is disposed downstream of the second heat exchanging part and upstream of the first connection portion in a flow direction of the heat-transfer medium in the second temperature adjustment circuit in the non-circulation state.

According to (9), since the second pump is disposed downstream of the second heat exchanging part, it is possible to efficiently suppress heat generation caused by operation of the second pump. In addition, since the second pump can be used in a limited temperature range, a highly versatile second pump can be used.

(10) The temperature adjustment circuit according to any one of (1) to (9),
in which, in the first temperature adjustment circuit, the first pump, the first heat exchanging part, and the first cooling target are arranged in this order in a flow direction of the heat-transfer medium in the first temperature adjustment circuit in the non-circulation state.

According to (10), the heat-transfer medium can be supplied from the first heat exchanging part to the first cooling target without being affected by heat of the first pump.

(11) The temperature adjustment circuit according to any one of (1) to (10),
in which, in the first temperature adjustment circuit, the first pump is disposed between the second connection portion of the first temperature adjustment circuit and the first heat exchanging part in a flow direction of the heat-transfer medium in the first temperature adjustment circuit in the non-circulation state.

According to (11), when the heat-transfer medium is circulated only by the second pump in the circulation state, pressure drop can be reduced since the heat-transfer medium is circulated without passing through the first heat exchanging part.

REFERENCE SIGNS LIST 1 temperature adjustment circuit
2 battery (first cooling target)
3 charger
4 first temperature adjustment circuit
5 power conversion device (second cooling target)
6 second temperature adjustment circuit
7 connection circuit
8 first connection path
9 second connection path
10 control device
11 chiller (first heat exchanging part)
12 radiator (second heat exchanging part)
13 buffer tank
14 first connection portion of second temperature adjustment circuit
15 first connection portion of first temperature adjustment circuit
16 second connection portion of second temperature adjustment circuit
17 second connection portion of first temperature adjustment circuit
EWP1 first pump
EWP2 second pump
EWV1 first electrically-actuated shut-off valve
EWV2 second electrically-actuated shut-off valve

The invention claimed is:

1. A temperature adjustment circuit comprising:
a first temperature adjustment circuit that includes:
a first pump that is configured to supply a heat-transfer medium to a first cooling target and
a first heat exchanging part that transfers heat between the heat-transfer medium and an air-conditioning refrigerant;
a second temperature adjustment circuit that includes:
a second pump that is configured to supply the heat-transfer medium to a second cooling target and
a second heat exchanging part that transfers heat between the heat-transfer medium and outside air;
a first connection path that connects a first connection portion of the first temperature adjustment circuit and a first connection portion of the second temperature adjustment circuit;
a second connection path that connects a second connection portion of the first temperature adjustment circuit and a second connection portion of the second temperature adjustment circuit; and
a switching part that is configured to switch between
a circulation state where the heat-transfer medium is circulated through a connection circuit in which the first temperature adjustment circuit and the second temperature adjustment circuit are connected to each other and
a non-circulation state where the heat-transfer medium is not circulated through the connection circuit,
wherein the first heat exchanging part is disposed between the second connection portion of the first temperature adjustment circuit and the first connection portion of the first temperature adjustment circuit in a flow direction of the heat-transfer medium in the first temperature adjustment circuit in the non-circulation state, and
wherein the switching part includes:
a first shut-off valve that is provided between the second connection portion of the first temperature adjustment circuit and the first heat exchanging part in a flow direction of the heat-transfer medium in the first temperature adjustment circuit in the non-circulation state and
a second shut-off valve that is provided between the first connection portion of the second temperature adjustment circuit and the first connection portion of the first temperature adjustment circuit in a flow direction of the heat-transfer medium in the connection circuit in the circulation state.

2. The temperature adjustment circuit according to claim 1, further comprising:
a control device that is configured to control the first shut-off valve and the second shut-off valve,
wherein the control device
sets the first shut-off valve to a valve-closed state and the second shut-off valve to a valve-open state in the circulation state and
sets the first shut-off valve to a valve-open state and the second shut-off valve to a valve-closed state in the non-circulation state.

3. The temperature adjustment circuit according to claim 1,
wherein the first cooling target is a battery,
wherein the second cooling target is a power conversion device, and
wherein, in the circulation state, the heat-transfer medium flows through the second cooling target, the second heat exchanging part, and the first cooling target in this order.

4. The temperature adjustment circuit according to claim 3,
wherein the first temperature adjustment circuit further includes a charger.

5. The temperature adjustment circuit according to claim 3,
wherein the second temperature adjustment circuit further includes a charger.

6. The temperature adjustment circuit according to claim 4,
wherein the second temperature adjustment circuit further includes a buffer tank that is disposed downstream of the second cooling target and upstream of the second heat exchanging part in a flow direction of the heat-transfer medium in the second temperature adjustment circuit in the non-circulation state.

7. The temperature adjustment circuit according to claim 4,
wherein the second temperature adjustment circuit further includes a buffer tank that is disposed downstream of the second heat exchanging part and upstream of the second pump in a flow direction of the heat-transfer medium in the second temperature adjustment circuit in the non-circulation state.

8. The temperature adjustment circuit according to claim 1,
wherein, in the second temperature adjustment circuit, the second pump is disposed downstream of the second heat exchanging part and upstream of the first connection portion in a flow direction of the heat-transfer medium in the second temperature adjustment circuit in the non-circulation state.

9. The temperature adjustment circuit according to claim 1,
wherein, in the first temperature adjustment circuit, the first pump, the first heat exchanging part, and the first cooling target are arranged in this order in a flow direction of the heat-transfer medium in the first temperature adjustment circuit in the non-circulation state.

10. The temperature adjustment circuit according to claim 1,
wherein, in the first temperature adjustment circuit, the first pump is disposed between the second connection portion of the first temperature adjustment circuit and the first connection portion of the first temperature adjustment circuit in a flow direction of the heat-transfer medium in the first temperature adjustment circuit in the non-circulation state.

11. A temperature adjustment circuit comprising:
a first temperature adjustment circuit that includes:
    a first pump that is configured to supply a heat-transfer medium to a first cooling target and
    a first heat exchanging part that transforms heat between the heat-transfer medium and an air-conditioning refrigerant;
a second temperature adjustment circuit that includes:
    a second pump that is configured to supply the heat-transfer medium to a second cooling target and
    a second heat exchanging part that transfers heat between the heat-transfer medium and outside air;
a first connection path that connects a first connection portion of the first temperature adjustment circuit and a first connection portion of the second temperature adjustment circuit;
a second connection path that connects a second connection portion of the first temperature adjustment circuit and a second connection portion of the second temperature adjustment circuit; and
a switching part that is configured to switch between
    a circulation state where the heat-transfer medium is circulated through a connection circuit in which the first temperature adjustment circuit and the second temperature adjustment circuit are connected to each other and
    a non-circulation state where the heat-transfer medium is not circulated through the connection circuit,
wherein the first heat exchanging part is disposed between the second connection portion of the first temperature adjustment circuit and the first connection portion of the first temperature adjustment circuit in a flow direction of the heat-transfer medium in the first temperature adjustment circuit in the non-circulation state,
wherein the first cooling target is a battery,
wherein the second cooling target is a power conversion device, and
wherein, in the circulation state, the heat-transfer medium flows through the second cooling target, the second heat exchanging part, and the first cooling target in this order.

12. The temperature adjustment circuit according to claim 11,
wherein the first temperature adjustment circuit further includes a charger.

13. The temperature adjustment circuit according to claim 11,
wherein the second temperature adjustment circuit further includes a charger.

14. The temperature adjustment circuit according to claim 11,
wherein the second temperature adjustment circuit further includes a buffer tank that is disposed downstream of the second cooling target and upstream of the second heat exchanging part in a flow direction of the heat-transfer medium in the second temperature adjustment circuit in the non-circulation state.

15. The temperature adjustment circuit according to claim 11,
wherein the second temperature adjustment circuit further includes a buffer tank that is disposed downstream of the second heat exchanging part and upstream of the second pump in a flow direction of the heat-transfer medium in the second temperature adjustment circuit in the non-circulation state.

\* \* \* \* \*